United States Patent
Yoon

(10) Patent No.: US 6,885,899 B1
(45) Date of Patent: Apr. 26, 2005

(54) METHOD AND APPARATUS FOR CONTROLLING A SOUND FUNCTION OF A COMPUTER SYSTEM

(75) Inventor: An-Sung Yoon, Suwon (KR)

(73) Assignee: Samsung Electronics, Co., LTD, Suwon-si (KR)

( * ) Notice: Subject to any disclaimer, the term of this patent is extended or adjusted under 35 U.S.C. 154(b) by 0 days.

(21) Appl. No.: 09/379,634

(22) Filed: Aug. 24, 1999

(30) Foreign Application Priority Data

Aug. 25, 1998 (KR) .............................. 98/34447

(51) Int. Cl.⁷ .................. G06F 17/00; H04B 15/00; H02B 1/00
(52) U.S. Cl. .................. 700/94; 381/94.5; 381/123; 381/74; 381/94
(58) Field of Search .................. 381/94, 120, 123, 381/74; 700/94, 94.5

(56) References Cited

U.S. PATENT DOCUMENTS 5,910,991 A * 6/1999 Farrar .................. 381/59

6,424,875 B1 * 7/2002 Yoon .................. 340/629

* cited by examiner

Primary Examiner—Forester W. Isen
Assistant Examiner—Devona E Faulk
(74) Attorney, Agent, or Firm—Robert E. Bushnell, Esq.

(57) ABSTRACT

A method and an apparatus for controlling a sound function of a computer system based on whether or not a headphone plug is inserted into a monitor is disclosed. A switching section receives a sound signal from a main body of the computer system and outputs the sound signal to a speaker or to an inserted headphone plug based on whether or not the headphone plug is inserted by a user. A signal detecting section detects an insertion voltage signal by monitoring an insertion of the headphone plug from the switching section. A control section compares the insertion voltage signal from the signal detecting section with a predetermined reference voltage signal, and controls a speaker installed in the main body according to the compared result. Accordingly, the user can enjoy sound, such as music, regardless of the time.

16 Claims, 8 Drawing Sheets

METHOD AND APPARATUS FOR CONTROLLING A SOUND FUNCTION OF A COMPUTER SYSTEM

This application makes reference to, incorporates the same herein, and claims all benefits accruing under 35 U.S.C. §119 from my application METHOD AND APPARATUS FOR CONTROLLING A SOUND FUNCTION OF A COMPUTER SYSTEM filed with the Korean Industrial Property Office on 25 Aug. 1998 and there duly assigned Ser. No. 34447/1998.

BACKGROUND OF THE INVENTION

1. Technical Field

The present invention relates to a method and an apparatus for controlling a sound function of a computer system and, more particularly, to a method and an apparatus for controlling a sound function of a computer system based on whether or not a headphone plug is inserted into a monitor having a speaker and a headphone jack.

2. Related Art

In general, a monitor system of a multi-media personal computer system (hereinafter, referred to as computer system) has a speaker and a headphone jack for supplying sound which is generated from a main body of the computer system to a user.

Typically, in such arrangement, sound is continuously outputted from speakers in a computer main body, even when a headphone plug is inserted into a switching system or other component of the computer system. Thus, even when the user wants to listen to sound privately on headphones, sound emanates from the speakers, thereby possibly disturbing others in the area.

Therefore, there is a need for a method and apparatus in which insertion and non-insertion of a headphone jack is detected, and in which speakers are selectively turned off and turned on in response to insertion and non-insertion, respectively, of the headphone jack.

SUMMARY OF THE INVENTION

Therefore, it is an object of the present invention to provide a method for controlling a sound function of a computer system based on whether or not the headphone plug is inserted into a monitor having a speaker and a headphone jack.

It is another object of the present invention to provide an apparatus for controlling the sound function of the computer system based on whether or not the headphone plug is inserted into the monitor having a speaker and a headphone jack.

In order to achieve the above objects, the present invention provides a method for controlling a sound function of a computer system having a monitor in which a switching section for selectively outputting a sound inputted from a main body of the computer system to a user through a speaker or a headphone jack is installed, which comprises the steps of:

(I) receiving an insertion voltage signal detected by monitoring an insertion of a headphone plug from said switching section; and (ii) controlling a speaker installed in said main body in response to the insertion voltage signal.

In order to achieve the above objects, the present invention provides a method for controlling a sound function of a computer system having a monitor in which a switching section for selectively outputting a sound inputted from a main body of the computer system to a user through a speaker or a headphone jack is installed, which comprises the steps of:

(A) receiving a mode signal determined based on an insertion voltage signal detected by monitoring an insertion of a headphone plug from the switching section; and (B) controlling a speaker installed in said main body in response to the mode signal.

In order to achieve the above objects, the present invention provides a method for controlling a sound function of a computer system having a monitor in which a switching section for selectively outputting a sound inputted from a main body of the computer system to a user through a speaker or a headphone jack is installed, which comprises the steps of:

(a) detecting an insertion voltage signal by monitoring an insertion of a headphone plug from the switching section;

(b) comparing the insertion voltage signal with a predetermined reference voltage signal;

(c) supplying a headphone mode signal which represents an insertion of the headphone plug in the computer system, and turning off the speaker installed in the main body of the computer system when a voltage level of the insertion voltage signal is less than a voltage level of the predetermined reference voltage signal; and (d) supplying a speaker mode signal which represents non-insertion of the headphone plug in the computer system when the voltage level of the insertion voltage signal is not less than the voltage level of the predetermined reference voltage signal.

In order to achieve the above objects, the present invention provides an apparatus for controlling a sound function of a computer system, which comprises:

switching means for receiving a sound signal from a main body of the computer system and outputting the sound signal to either a speaker or a headphone plug based on whether or not the headphone plug is inserted by a user;

signal detecting means for detecting an insertion voltage signal in order to monitor an insertion of the headphone plug from the switching means; and control means for comparing the insertion voltage signal from the signal detecting means with a predetermined reference voltage signal, and outputting either a speaker mode control signal or a headphone mode control signal for controlling an output of a speaker installed in the main body according to a compared result.

In order to achieve the above objects, the present invention provides an apparatus for controlling a sound function of a computer system, which comprises:

switching means for receiving a sound signal from a main body of the computer system and outputting the sound signal to either a speaker or a headphone plug based on whether or not the headphone plug is inserted by a user;

signal detecting means for detecting an insertion voltage signal in order to monitor an insertion of the headphone plug from the switching means;

first control means for comparing the insertion voltage signal from the signal detecting means with a predetermined reference voltage signal, and outputting either a speaker mode control signal or a headphone mode control signal according to a compared result; and second control means for turning off or turning on the speaker installed in the main body in response to the headphone mode signal or the speaker mode signal.

In the method and apparatus for controlling the sound function of the computer system according to the present invention, when the headphone plug is inserted into the headphone jack of the monitor, the sound from the speakers which are installed in the computer main body and the monitor, respectively, is automatically blocked. Accordingly, the user can enjoy the sound such as music regardless of the time.

BRIEF DESCRIPTION OF THE DRAWINGS

A more complete appreciation of the invention, and many of the attendant advantages, thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

A description will be given below in detail with reference to the accompanying drawings to a configuration and an operation of a method and an apparatus for controlling a sound function of a computer system according to embodiments of the present invention.

Figure 1:
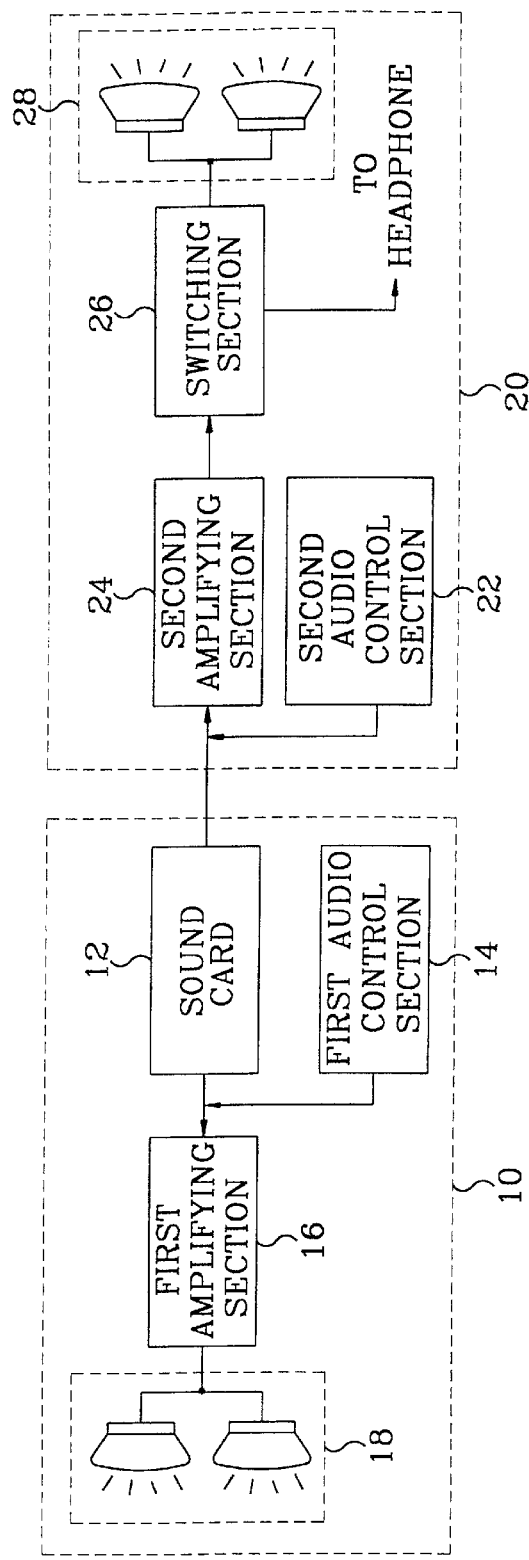
FIG. 1 is a block diagram showing the configuration of an apparatus for controlling a sound output of a computer system.

FIG. 1 is a block diagram showing the configuration of an apparatus for controlling a sound output of a computer system.

Referring to FIG. 1, a computer main body 10 has a sound card 12, a first audio control section 14, a first amplifying section 16 and a first set of speakers 18. Monitor 20 is electrically connected to computer main body 10 and has a second audio control section 22, a second amplifying section 24, a switching section 26 and a second set of speakers 28. Switching section 26 operates as a headphone jack, switches a sound signal from second amplifying section 24, and supplies the sound signal to second set of speakers 28 or to a headphone (not shown).

Sound card 12, installed in computer main body 10, generates the sound signal in response to a command from a user or a control signal from a microprocessor (not shown) installed in computer main body 10. The sound signal generated by sound card 12 is controlled by first audio control section 14. The sound signal is amplified by first amplifying section 16, and is supplied to the user through first speakers 18.

Also, the sound signal generated by sound card 12 is controlled by second audio control section 22 and is amplified by second amplifying section 24. The sound signal amplified by second amplifying section 24 is switched by switching section 26, and is supplied to the user through second speakers 28 or a headphone plug.

Figure 2:
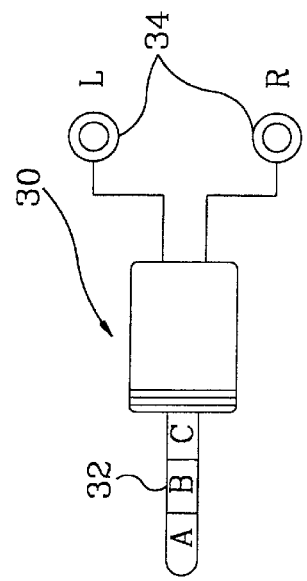
FIG. 2 is a view showing the configuration of a headphone.

FIG. 2 is a view showing the configuration of a headphone which can be used with the arrangement of FIG. 1.

Referring to FIG. 2, a headphone 30 is divided into a headphone plug 32 which is inserted into switching section 26, and an output section 34 which outputs the sound to the ears of the user. Headphone plug 32 is divided into a first section A which is connected with right headphone output lines SW6 and SW7 (FIG. 3) of switching section 26, a second section B which is connected with left headphone output lines SW4 and SW5, and a third section C which is connected with a ground line SW1.

Figure 3:
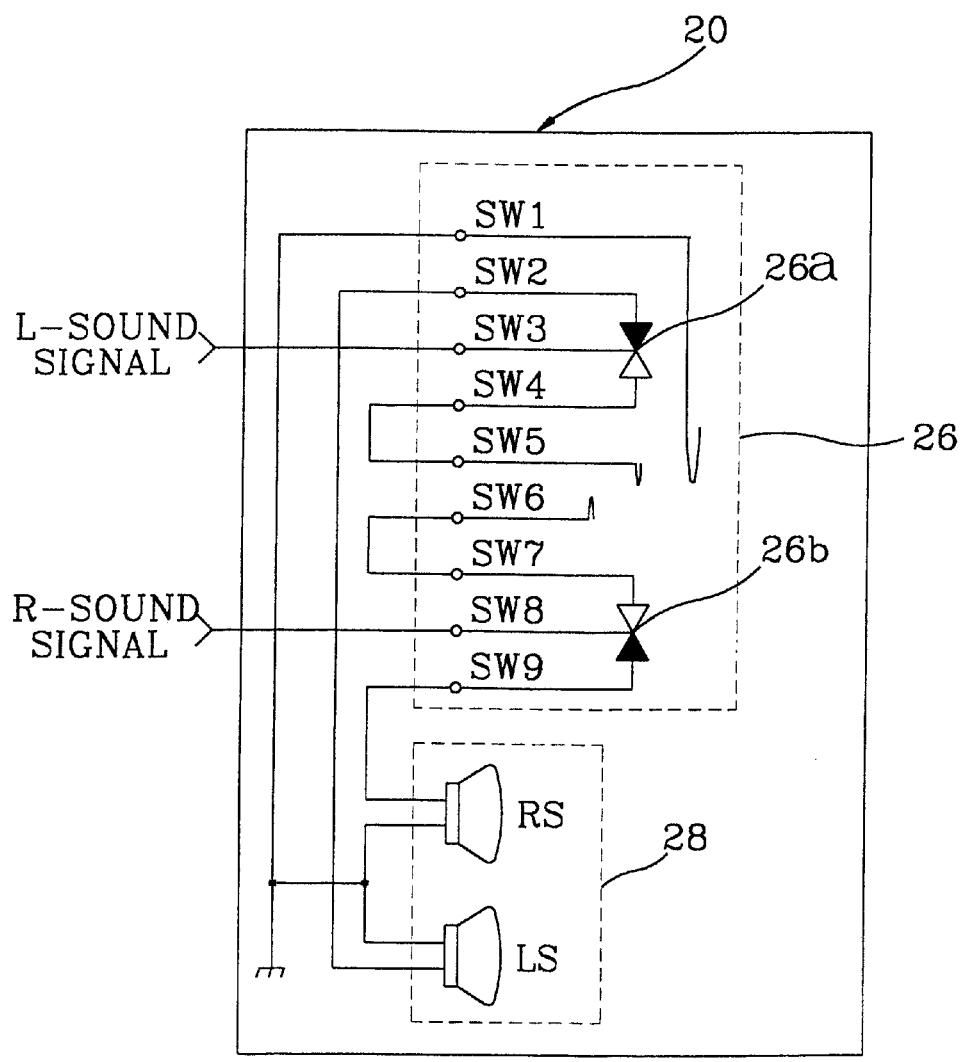
FIG. 3 is a view showing a circuit diagram of a switching section of an apparatus for controlling a sound output of a computer system shown in FIG. 1.

FIG. 3 is a view showing a circuit diagram of a switching section of an apparatus for controlling a sound output of the computer system shown in FIG. 1.

Referring to FIG. 3, in the case where headphone plug 32 is not inserted into switching section 26, a left sound input line SW3 and left headphone output lines SW4 and SW5 are not electrically connected whereas left sound input line SW3 and left speaker output line SW2 are electrically connected by the upper half of contact switch 26a. At this point, a right sound input line SW8 and right headphone output lines SW6 and SW7 are not electrically connected whereas right sound input line SW8 and right speaker output line SW9 are electrically connected by the lower of contact switch 26b. Accordingly, the sound signal from sound card 12 is supplied to the user through first and second speakers 18 and 28.

Conversely, in the case where headphone plug 32 is inserted into switching section 26, left sound input line SW3 and left headphone output lines SW4 and SW5 are electrically connected by contact switch 26a, whereas left sound input line SW3 and left speaker output line SW2 are not electrically connected. At this point, right sound input line SW8 and right headphone output lines SW6 and SW7 are electrically connected by contact switch 26b, whereas right sound input line SW8 and right speaker output line SW9 are not electrically connected. Accordingly, the sound signal from sound card 12 is supplied to the user through headphone 30.

However, in the above-described computer system, the sound is continuously outputted from first speakers 18 although headphone plug 32 is inserted into switching section 26. Accordingly, in the case where the user listens to sound, such as music, with headphone 30, other people are disturbed by the sound outputted through first speakers 18.

Embodiment 1

Figure 4:
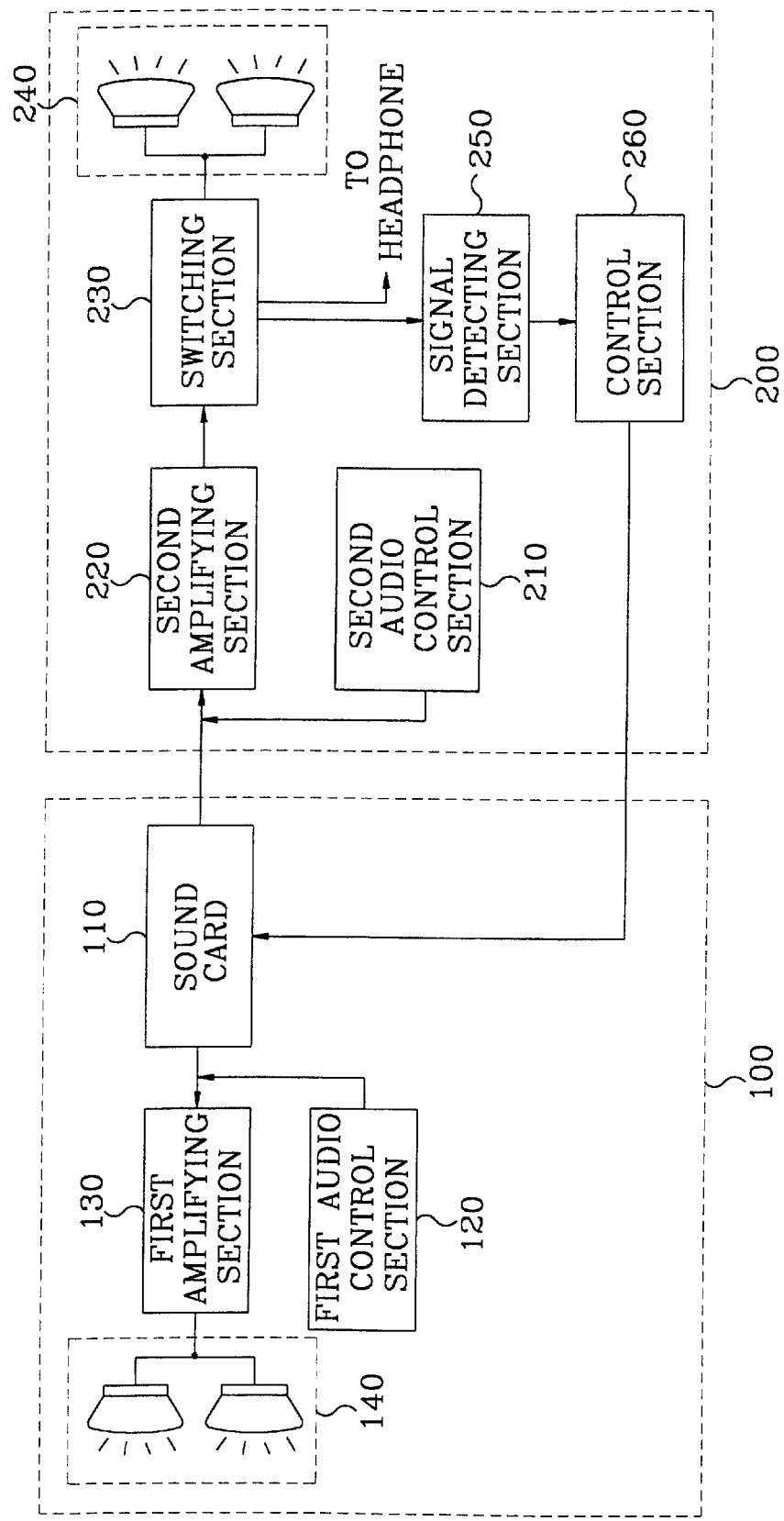
FIG. 4 is a block diagram showing the configuration of an apparatus for controlling a sound function of a computer system according to a first embodiment of the present invention.

FIG. 4 is a block diagram showing the configuration of an apparatus for controlling a sound function of a computer system according to a first embodiment of the present invention.

Referring to FIG. 4, the apparatus for controlling the sound function of the computer system according to the first embodiment of the present invention is divided into a computer main body 100 and a monitor 200.

Computer main body 100 has a sound card 110 for generating a sound signal, a first audio control section 120 for controlling the sound signal, a first amplifying section 130 for amplifying the sound signal, and a first speaker 140 for outputting the sound signal which is amplified by first amplifying section 130.

Monitor 200 has a second audio control section 210 for controlling the sound signal from sound card 110, a second amplifying section 220 for amplifying the sound signal from sound card 110, a switching section 230 for selectively supplying the sound signal amplified by second amplifying section 220 to either a second set of speakers 240 or a headphone (not shown), second speakers 240 for outputting the sound signal from switching section 230 to a user, a signal detecting section 250 for detecting whether or not a headphone plug 32 is inserted into switching section 230 so as to output an insertion voltage signal, and a control section 260 for controlling sound card 110 based on the insertion voltage signal from signal detecting section 250. In this embodiment, switching section 230 is a headphone jack.

Figure 5:
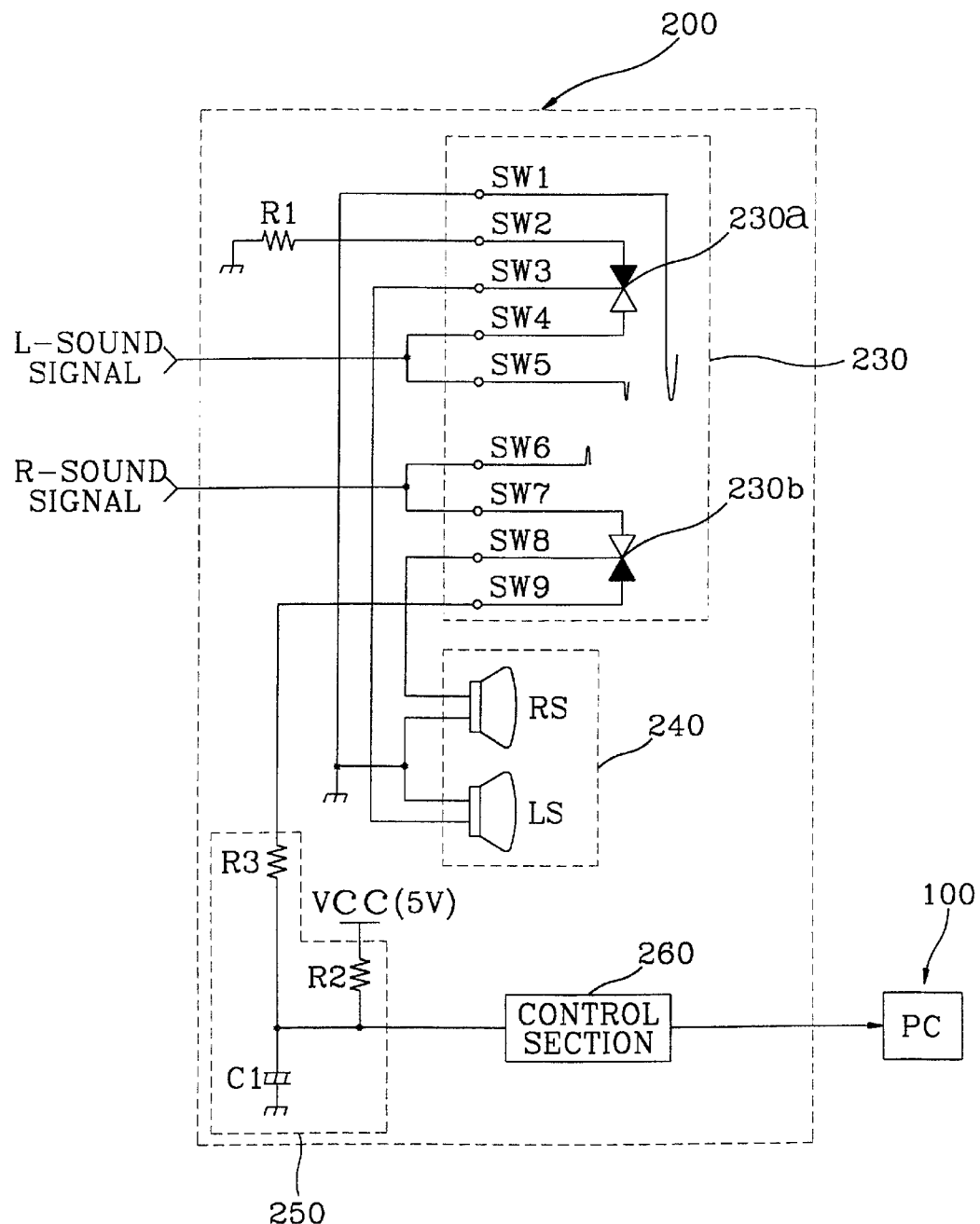
FIGS. 5 and 6 are a circuit diagram showing the circuit configuration of a monitor of the apparatus for controlling the sound function of the computer system shown in FIG. 4.

FIG. 5 is a circuit diagram showing the circuit configuration of a monitor of the apparatus for controlling the sound function of the computer system shown in FIG. 4;

Referring to FIG. 5, switching section 230 has a common ground line SW1 which is connected with a third section C of headphone plug 32, and which is connected with a ground line of second speakers 240; a left speaker ground line SW2 which is connected between a first contact switch 230a and ground; a left speaker output line SW3 which is connected between first contact switch 230a and a left speaker LS; a left speaker input line SW4 which is connected with first contact switch 230a; a left headphone output line SW5 which is connected with left speaker input line SW4, and which is connected with a second section B of headphone plug 32; a right headphone output line SW6 which is connected with a first section A of headphone plug 32; a right speaker input line SW7 which is connected between right headphone output line SW6 and a second contact switch 230b; a right speaker output line SW8 which is connected between second contact switch 230b and a right speaker RS; and a signal detecting line SW9 which is connected between second contact switch 230b and signal detecting section 250. A first resistor R1 is connected between left speaker ground line SW2 and ground. A left sound signal from second amplifying section 220 is inputted to left speaker input line SW4 and left headphone output line SW5. A right sound signal from second amplifying section 220 is inputted to right headphone output line SW6 and right speaker input line SW7.

In addition, signal detecting section 250 has a third resistor R3 connected between signal detecting line SW9 and a capacitor C1, and a second resistor R2 connected between control section 260 and capacitor C1. Second resistor R2 receives a voltage Vcc from an outside source. At this point, capacitor C1 gradually discharges a residual sound charged in second speaker 240 to remove a pop noise.

Figure 6:
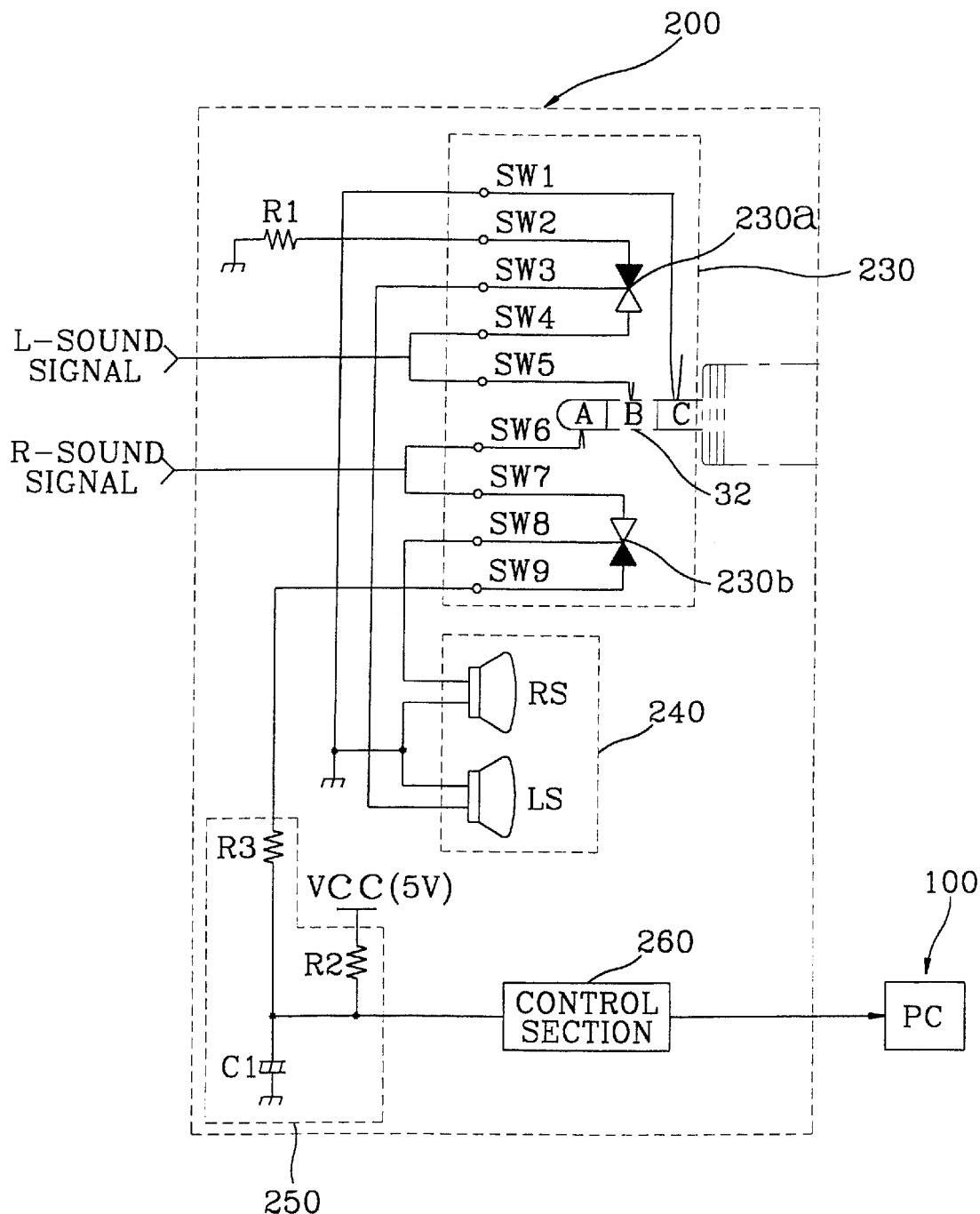

Hereinafter, the operation of the apparatus for controlling a sound function of a computer system according to the first embodiment of the present invention will be described with reference to FIG. 4 to FIG. 6. Firstly, a case where headphone plug 32 is not inserted into switching section 230 will be described.

When a sound control signal is generated from a main control section (not shown) installed in computer main body 100 according to a command of a user, sound card 110 generates the sound signal in response to the sound control signal and supplies the sound signal to first and second amplifying sections 130 and 220.

First audio control section 120 controls the sound signal supplied to first amplifying section 130, and second audio control section 220 controls the sound signal supplied to second amplifying section 220.

First amplifying section 130 amplifies the sound signal controlled by first audio control section 120, and first speaker 140 outputs the sound signal from first amplifying section 130 to the user.

Second amplifying section 220 amplifies the sound signal controlled by second audio control section 210 and supplies an amplified sound signal to switching section 230.

At this time, since headphone plug 32 is not inserted into switching section 230, left speaker output line SW3 and left speaker input line SW4 are electrically connected by the lower half of first contact switch 230a, and right speaker input line SW7 and right speaker output line SW8 are electrically turned connected the lower half of second contact switch 230b.

Accordingly, the sound signal which is supplied from second amplifying section 220 to switching section 230 is outputted to the user through left and right speakers LS and RS, respectively, of second speaker 240.

Also, whereas right speaker input line SW7 and right speaker output line SW8 are electrically connected, right speaker output line SW8 and signal detecting line SW9 are not electrically connected.

Accordingly, a voltage which is inputted to control section 260 maintains a voltage value of a high level. Since the insertion voltage signal which is outputted from signal detecting section 250 maintains the high level, control section 260 does not generate a control signal for blocking the sound signal applied to first speaker 140. Accordingly, the user can enjoy the sound which is outputted through first speaker 140 of computer main body 100 and second speaker 240 of monitor 200, respectively.

Next, when headphone plug 32 is inserted into switching section 230 by the user, left speaker output line SW3 and left speaker input line SW4 are not electrically connected by first contact switch 230a, and right speaker input line SW7 and right speaker output line SW8 are not electrically connected by second contact switch 230b. At this point, left speaker ground line SW2 and left speaker output line SW3 are electrically connected, and right speaker output line SW8 and signal detecting line SW9 are electrically turn connected.

Accordingly, the sound signal provided from second amplifying section 220 to switching section 230 is supplied to the user through left headphone output line SW5 and right headphone output line SW6.

Also, since signal detecting line SW9 is connected to ground through right speaker output line SW8, the insertion voltage signal which is supplied from signal detecting section 250 to control section 260 maintains a voltage value of a low level.

When an insertion voltage signal of low level is inputted from signal detecting section 250, control section 260 supplies a control signal to sound card 110 of computer main body 100, thereby blocking the sound signal supplied to first speaker 140.

Sound card 110 blocks the sound signal being supplied from first amplifying section 130 to first speaker 140 in response to the control signal from control section 260. Accordingly, when the user inserts headphone plug 32 into switching section 230, the sound outputted from first speaker 140 of computer main body 100 and second speaker 240 of monitor 200 is blocked.

Figure 7:
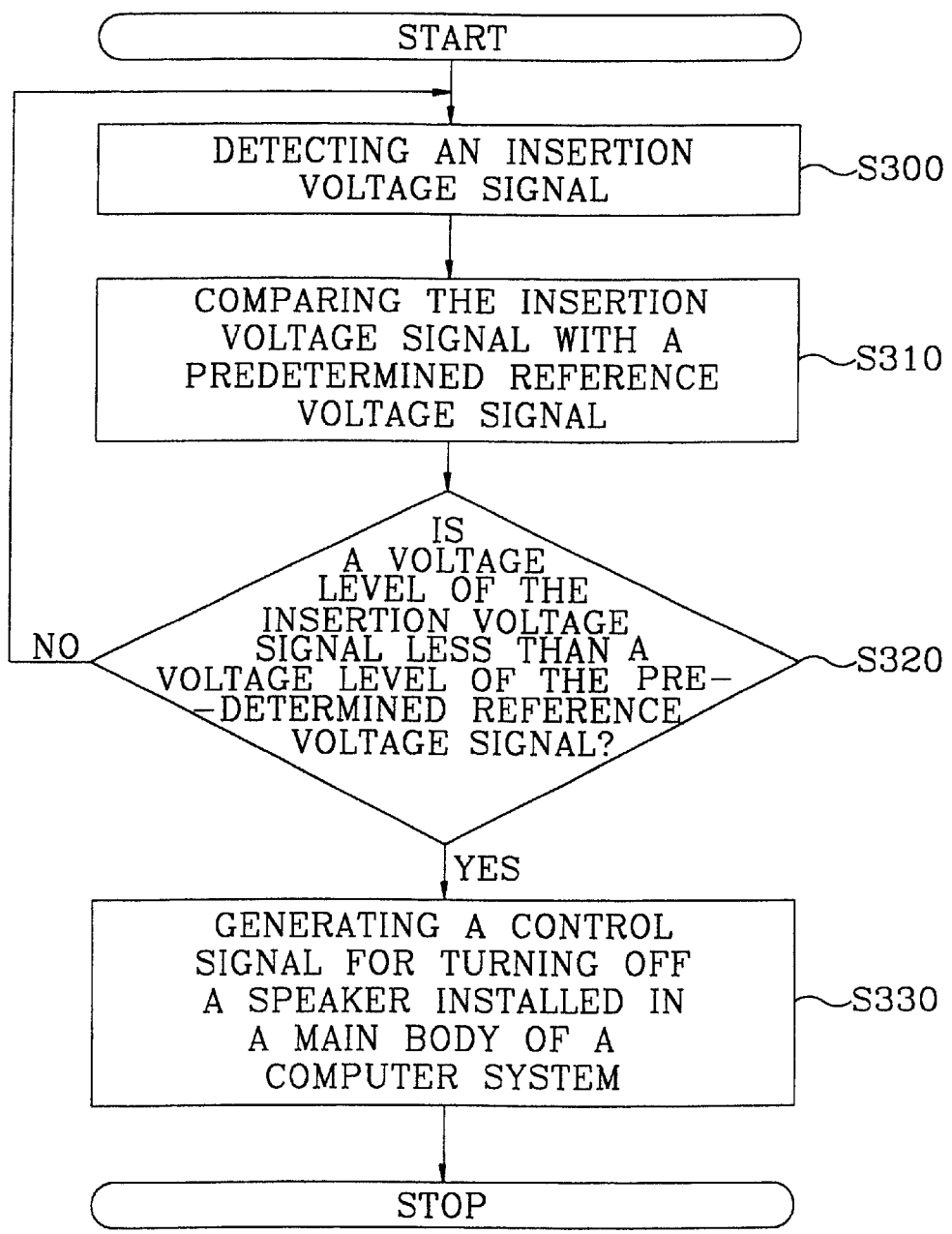
FIG. 7 is a flowchart illustrating a method for controlling the sound function of the computer system according to the first embodiment of the present invention.

FIG. 7 is a flowchart illustrating a method for controlling the sound function of the computer system according to the first embodiment of the present invention.

Referring to FIG. 7, control section 260 detects the insertion voltage signal from signal detecting section 250 (step S300) and compares the insertion voltage signal with a predetermined reference voltage signal (step S310).

Control section 260 determines whether or not a voltage level of the insertion voltage signal is less than a voltage level of the predetermined reference voltage signal (step S320).

When the voltage level of the insertion voltage signal is less than the voltage level of the predetermined reference voltage signal, control section 260 supplies a control signal for turning off first speakers 140 of computer main body 100 to sound card 110 in order to break the sound signal outputted from sound card 110 (step S330).

When the voltage level of the insertion voltage signal is not less than the voltage level of the predetermined reference voltage signal, control section returns to step S300.

Embodiment 2

Figure 8:
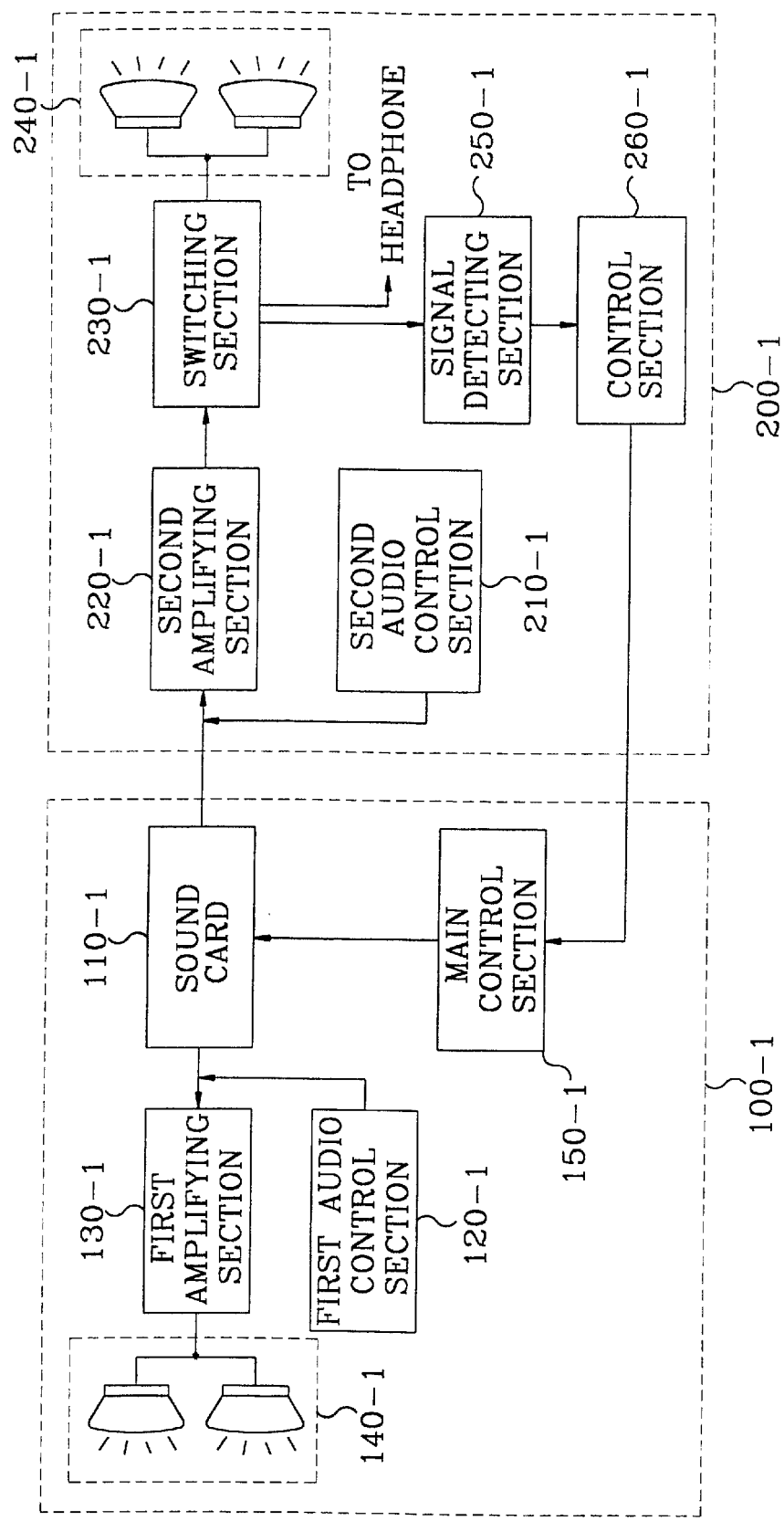
FIG. 8 is a block diagram showing the configuration of an apparatus for controlling a sound function of a computer system according to a second embodiment of the present invention.

FIG. 8 is a block diagram showing the configuration of an apparatus for controlling a sound function of a computer system according to a second embodiment of the present invention.

Referring to FIG. 8, the apparatus for controlling the sound function of the computer system according to the second embodiment of the present invention is divided into a computer main body 100-1 and a monitor 200-1.

Computer main body 100-1 has a sound card 110-1 for generating a sound signal, a first audio control section 120-1 for controlling the sound signal, a first amplifying section 130-1 for amplifying the sound signal, a first set of speakers 140-1 for outputting the sound signal which is amplified by first amplifying section 130-1, and a main control section 150-1 for controlling an operation of sound card 110-1 in response to a mode signal inputted from monitor 200-1.

Monitor 200-1 has a second audio control section 210-1 for controlling the sound signal from sound card 110-1, a second amplifying section 220-1 for amplifying the sound signal from sound card 110-1, a switching section 230-1 for selectively supplying the sound signal amplified by second amplifying section 220-1 to either a second set of speakers 240-1 or a headphone (not shown), second speakers 240-1 for outputting the sound signal from switching section 230-1 to a user, a signal detecting section 250-1 for detecting whether or not a headphone plug 32 is inserted into switching section 230-1 so as to output an insertion voltage signals and a control section 260-1 for supplying either a speaker mode signal or a headphone mode signal to main control section 150-1 based on the insertion voltage signal from signal detecting section 250-1.

Sound card 110-1, first and second audio control sections 120-1 and 210-1, first and second amplifying sections 130-1 and 220-1, first and second speakers 140-1 and 240-1, switching section 230-1, and signal detecting section 250-1 execute an operation which is identical to the operations of sound card 110, first and second audio control sections 120 and 210, first and second amplifying sections 130 and 220, first and second speakers 140 and 240, switching section 230, and signal detecting section 250 in the first embodiment of the present invention as shown in FIG. 4. Also, the configuration of switching section 230-1 is identical to the configuration of switching section 230 according to the first embodiment of the present invention as shown in FIG. 6.

However, control section 260-1 selectively supplies either the speaker mode signal or the headphone mode signal to main control section 150-1 based on a voltage level of the insertion voltage signal which is inputted from signal detection section 250-1.

That is, when the voltage level of the insertion voltage level from signal detecting section 250-1 is a low level, control section 260-1 supplies the headphone mode signal, which represents that headphone plug 32 is inserted into switching section 230-1, to main control section 150-1. When the voltage level of the insertion voltage level from signal detecting section 250-1 is a high level, control section 260-1 supplies the speaker mode signal, which represents that headphone plug 32 is not inserted into switching section 230-1, to main control section 150-1. At this point, the switching operation of switching section 230-1 is identical to the switching operation of switching section 230 according to the first embodiment of the present invention described above with reference to FIG. 4.

When the speaker mode signal is inputted from control section 260-1, main control section 150-1 does not generate a control signal for blocking the sound signal which is outputted from sound card 110-1.

When the headphone mode signal is inputted from control section 260-1, main control section 150-1 supplies a control signal to sound card 110-I to block the sound signal which is outputted from sound card 110-1.

Figure 9:
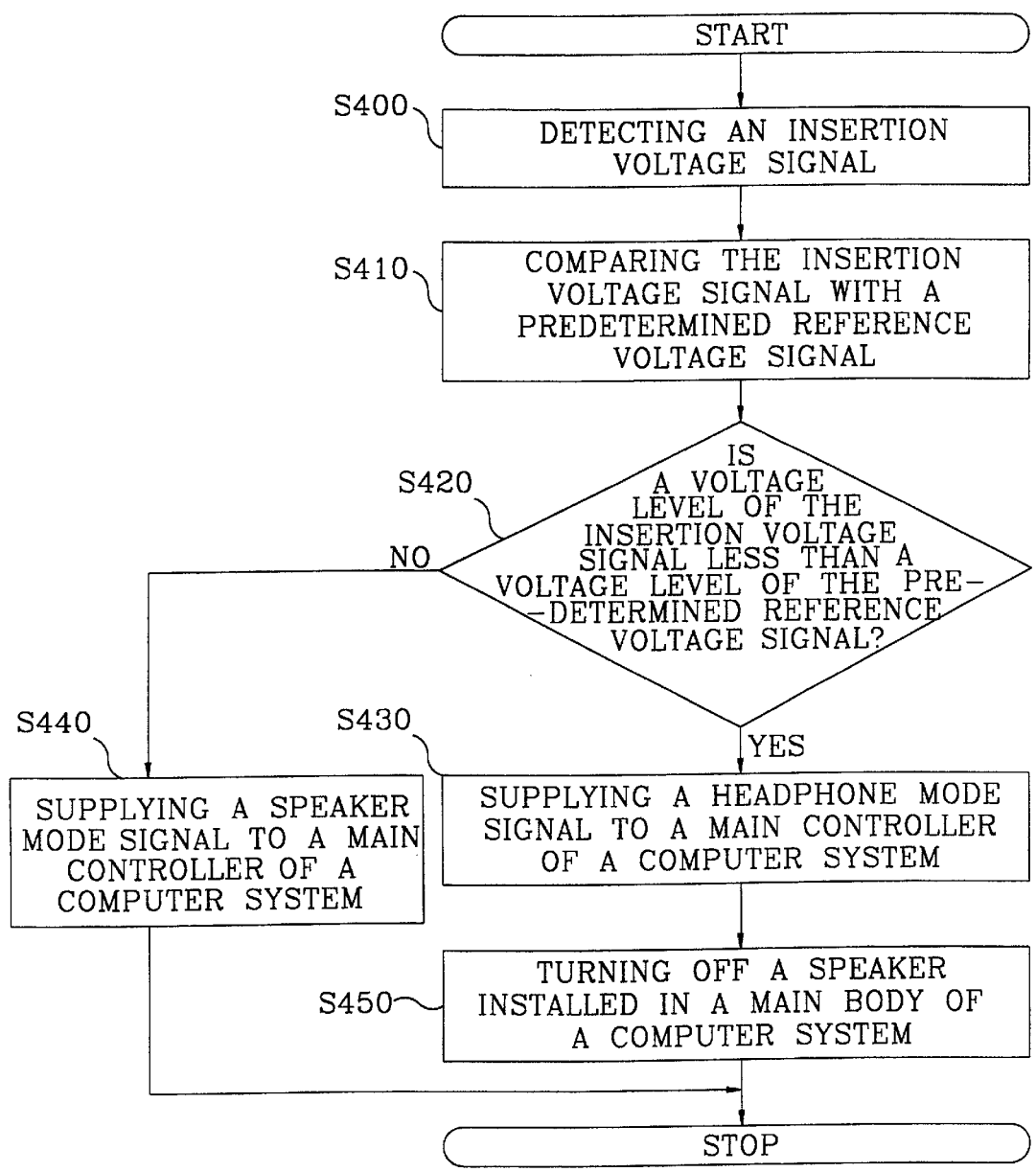
FIG. 9 is a flowchart illustrating a method for controlling the sound function of the computer system according to the second embodiment of the present invention.

FIG. 9 is a flowchart illustrating a method for controlling the sound function of the computer system according to the second embodiment of the present invention.

Referring to FIG. 9, control section 260-1 detects the insertion voltage signal from signal detecting section 250-1 (step S400) and compares the insertion voltage signal with a predetermined reference voltage signal (step S410).

Control section 260-1 determines whether or not a voltage level of the insertion voltage signal is less than a voltage level of the predetermined reference voltage signal (step S420).

When the voltage level of the insertion voltage signal is less than the voltage level of the predetermined reference voltage signal, control section 260-1 supplies the headphone mode signal, which represents that headphone plug 32 is inserted into switching section 230-1, to main control section 150-1 (step S430).

When the voltage level of the insertion voltage signal is not less than the voltage level of the 1 predetermined reference voltage signal, control section 260-1 supplies the speaker mode signal, which represents that headphone plug 32 is not inserted into switching section 230-1, to main control section 150-1, and finishes the steps described above.

When the headphone mode signal is inputted from control section 260-1, main control section 150-1 supplies a control signal, for turning off first speaker 140-1 of computer main body 100-1, to sound card 110-1. Accordingly, the sound signal outputted from sound card 110-1 is blocked (step S450).

In the method and apparatus for controlling the sound function of the computer system according to the present invention, when the headphone plug is inserted into the headphone jack of the monitor, the sound from the speakers which are installed in the computer main body and the monitor, respectively, is automatically blocked. Accordingly, the user can enjoy sound, such as music, regardless of the time.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A method for controlling a sound function, comprising the steps of:
   (i) operating a switching section of a computer system having a main body which includes a first speaker and a monitor which includes a second speaker and a headphone jack to selectively output a sound inputted from the main body to a user through one of the second speaker and the headphone jack;
   (ii) receiving an insertion voltage signal detected by monitoring an insertion of the headphone plug into said switching section; and
   (iii) controlling the first speaker in said main body in response to the insertion voltage signal.

2. The method as claimed in claim 1, wherein said step (iii) comprises the substeps of:
   (iii-1) comparing the insertion voltage signal with a predetermined reference voltage signal; and
   (iii-2) generating a control signal for turning off said first speaker in said main body when a voltage level of the insertion voltage signal is less than a voltage level of the predetermined reference voltage signal.

3. A method for controlling a sound function comprising steps of:
   (A) operating a switching section of a computer system having a main body which includes a first speaker and a monitor which includes a second speaker and a headphone jack to selectively output a sound inputted from the main body to a user through one of the second speaker and the headphone jack;
   (B) receiving a mode signal which is determined based on an insertion voltage signal detected by monitoring an insertion of the headphone plug into said switching section; and
   (C) controlling the first speaker in said main body in response to the mode signal.

4. The method as claimed in claim 3, wherein said step (B) comprises the substeps of:
   (B-1) detecting the insertion voltage signal by monitoring the insertion of said headphone plug into said switching section;
   (B-2) comparing the insertion voltage signal with a predetermined reference voltage signal;
   (B-3) generating a headphone mode signal which represents the insertion of said headphone plug into said switching section when a voltage level of the insertion voltage level is less than a voltage level of the predetermined reference voltage signal; and
   (B-4) generating a speaker mode signal which represents non-insertion of said headphone plug into said switching section when the voltage level of the insertion voltage level is not less than the voltage level of the predetermined reference voltage signal.

5. The method as claimed in claim 3, wherein said step (C) comprises the substeps of:
   (C-1) turning on said first speaker of said main body in response to the speaker mode signal; and
   (C-2) turning off said first speaker of said main body in response to the headphone mode signal.

6. A method for controlling a sound function comprising the steps of:
   (a) operating a switching section of a computer system having a main body which includes a first speaker and a monitor which includes a second speaker and a headphone jack to selectively output a sound inputted from the main body to a user through one of the second speaker and the headphone jack;
   (b) detecting an insertion voltage signal by monitoring an insertion of the headphone plug into said switching section;
   (c) comparing the insertion voltage signal with a predetermined reference voltage signal;
   (d) supplying a headphone mode signal which represents the insertion of said headphone plug into said switching section and turning off said first speaker in said main body of said computer system when a voltage level of the insertion voltage signal is less than a voltage level of the predetermined reference voltage signal; and
   (e) supplying a speaker mode signal which represents non-insertion of said headphone plug into said switching section when the voltage level of the insertion voltage signal is not less than the voltage level of the predetermined reference voltage signal.

7. An apparatus for controlling a sound function of a computer system, said apparatus comprising:
   switching means for receiving a sound signal from a main body of said computer system and having a first output connected to a first speaker for outputting the sound signal to the first speaker and having a second output connected to a headphone plug for outputting the sound signal to the headphone plug, said switching means outputting the sound signal to said first speaker when the headphone plug is not inserted by the user and outputting the sound signal only to the headphone plug when the headphone plug is inserted by the user;
   signal detecting means having an input connected to said switching means for detecting an insertion voltage signal from said switching means so as to monitor an insertion of said headphone plug into said switching means; and
   control means connected to said signal detecting means for comparing the insertion voltage signal detected by said signal detecting means with a predetermined reference voltage signal, and for outputting one of a speaker mode control signal and a headphone mode control signal for controlling an output of a second speaker installed in said main body according to a compared result.

8. The apparatus as claimed in claim 7, wherein said signal detecting means comprises:
   a first resistor for outputting the insertion voltage signal with a low level when said headphone plug is inserted into said switching means; and
   a second resistor for outputting the insertion voltage signal with a high level when said headphone plug is not inserted into said switching means.

9. The apparatus as claimed in claim 8, wherein said signal detecting means further comprises a capacitor for gradually discharging a residual sound charged in said second speaker.

10. The apparatus as claimed in claim 7, wherein said control means outputs the headphone mode control signal which represents that the headphone plug is inserted into said switching means when a voltage level of the insertion voltage signal is less than a voltage level of the predetermined reference voltage signal.

11. The apparatus as claimed in claim 7, wherein said second speaker in said main body is turned off in response to the headphone mode control signal from said control means.

12. The apparatus as claimed in claim 7, wherein said control means outputs the speaker mode control signal which represents that the headphone plug is not inserted into said switching means when a voltage level of the insertion voltage signal is not less than a voltage level of the predetermined reference voltage signal.

13. An apparatus for controlling a sound function of a computer system, said apparatus comprising:

switching means for receiving a sound signal from a main body of said computer system and for outputting the sound signal to one of a first speaker and a headphone plug based on whether or not the headphone plug is inserted by a user;

signal detecting means for detecting an insertion voltage signal from said switching means in order to monitor an insertion of said headphone plug;

first control means for comparing the insertion voltage signal detected by said signal detecting means with a predetermined reference voltage signal, and for outputting one of a speaker mode control signal and a headphone mode control signal according to a compared result; and second control means for turning off and turning on a second speaker installed in said main body in response to the headphone mode signal and the speaker mode signal, respectively.

14. The apparatus as claimed in claim 13, wherein said second control means turns off said second speaker installed in said main body when the headphone mode signal is inputted from said first control means, and turns on said second speaker installed in said main body when the speaker mode signal is inputted from said first control means.

15. A method for controlling a sound function of a computer system having a main body which includes a first speaker and a monitor which includes a second speaker, a headphone jack and a switching section, said method comprising the steps of:

(a) operating the switching section to selectively output a sound inputted from the main body to a user through one of the second speaker and the headphone jack;

(b) detecting an insertion voltage signal by monitoring an insertion of a headphone plug into said switching section;

(c) supplying a headphone mode signal which represents the insertion of said headphone plug into said switching section and turning off said speaker in said main body of said computer system when the insertion voltage signal has a first voltage level; and (d) supplying a speaker mode signal which represents non-insertion of said headphone plug into said switching section when the insertion voltage signal has a second voltage level.

16. An apparatus for controlling a sound function of a computer system having a main body which includes a first speaker and a monitor which includes a second speaker, said apparatus comprising:

a switching section for selectively outputting a sound inputted from the main body of said computer system to a user through one of the second speaker and a headphone jack depending on whether or not a headphone plug is inserted into the headphone jack;

detecting means for detecting an insertion voltage signal by monitoring insertion of the headphone plug into the headphone jack;

supplying means for supplying a headphone mode signal which represents the insertion of said headphone plug into the headphone jack when the insertion voltage signal has a first voltage level, and for supplying a speaker mode signal which represents non-insertion of said headphone plug into the headphone jack when the insertion voltage signal has a second voltage level; and control means for turning off said first speaker in response to said headphone mode signal, and for turning on said first speaker in response to said speaker mode signal.

* * * * *